(12) United States Patent
Bhogal et al.

(10) Patent No.: US 9,086,788 B2
(45) Date of Patent: Jul. 21, 2015

(54) CONTEXT-SENSITIVE COLLABORATION CHANNELS

(71) Applicant: International Business Machines Corporation, Armonk, NY (US)

(72) Inventors: Kulvir S. Bhogal, Pflugerville, TX (US); Gregory J. Boss, Saginaw, MI (US); Rick A. Hamilton, II, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/082,132

(22) Filed: Nov. 16, 2013

(65) Prior Publication Data

US 2014/0075331 A1    Mar. 13, 2014

Related U.S. Application Data

(63) Continuation of application No. 13/323,681, filed on Dec. 12, 2011, now abandoned.

(51) Int. Cl.
*G06F 15/16* (2006.01)
*G06F 3/0484* (2013.01)
*G06Q 10/10* (2012.01)

(52) U.S. Cl.
CPC ............ *G06F 3/0484* (2013.01); *G06Q 10/103* (2013.01)

(58) Field of Classification Search
CPC ... H04L 63/20; H04L 12/1859; H04L 12/581; H04L 51/04; H04L 67/18; G06F 3/0484; G06F 17/30905
USPC .................................. 709/204, 205; 455/3, 75
See application file for complete search history.

(56) References Cited

U.S. PATENT DOCUMENTS

| 5,572,648 | A | 11/1996 | Bibayan |
| 5,799,292 | A | 8/1998 | Hekmatpour |
| 5,864,819 | A | 1/1999 | De Armas et al. |

(Continued)

FOREIGN PATENT DOCUMENTS

| CN | 101567858 A | 4/2011 |
| EP | 0961197 A1 | 1/1999 |

(Continued)

OTHER PUBLICATIONS

Office action dated Nov. 27, 2013, regarding U.S. Appl. No. 13/323,681, 20 pages.

(Continued)

*Primary Examiner* — Tesfay Yohannes
(74) *Attorney, Agent, or Firm* — Yee & Associates, P.C.; Damion Josephs

(57) ABSTRACT

An apparatus and computer program product for collaborating is disclosed. Responsive to a computer system receiving a selection from a user for a portion of a document, the computer system identifies a context for the selected portion of the document. The computer system identifies a set of collaboration channels corresponding to the context. The computer system determines whether the set of collaboration channels corresponding to the context is empty. The computer system then creates a new collaboration channel based on the context for the selected portion of the document responsive to the set of collaboration channels corresponding to the context being empty.

17 Claims, 5 Drawing Sheets

(56) References Cited

U.S. PATENT DOCUMENTS

| | | | |
|---|---|---|---|
| 6,052,676 A | 4/2000 | Hekmatpour | |
| 6,059,842 A | 5/2000 | Dumarot et al. | |
| 6,292,174 B1 | 9/2001 | Mallett et al. | |
| 6,654,032 B1 | 11/2003 | Zhu et al. | |
| 6,714,778 B2 | 3/2004 | Nykanen et al. | |
| 6,928,461 B2 | 8/2005 | Tuli | |
| 7,103,836 B1 | 9/2006 | Nakamura et al. | |
| 7,203,708 B2 | 4/2007 | Lin et al. | |
| 7,216,002 B1 | 5/2007 | Anderson | |
| 7,275,116 B1 | 9/2007 | Hanmann et al. | |
| 7,340,534 B2 | 3/2008 | Cameron et al. | |
| 7,360,166 B1 | 4/2008 | Krzanowski | |
| 7,386,801 B1 | 6/2008 | Horvitz et al. | |
| 7,454,386 B2 | 11/2008 | Chakraborty | |
| 7,530,020 B2 | 5/2009 | Szabo | |
| 7,620,621 B2 | 11/2009 | Fuselier et al. | |
| 7,660,604 B2 | 2/2010 | Ueda | |
| 7,672,873 B2 | 3/2010 | Kindig et al. | |
| 7,743,135 B2 | 6/2010 | Azuma | |
| 7,757,114 B2 | 7/2010 | Watanabe | |
| 7,801,896 B2 | 9/2010 | Szabo | |
| 7,853,900 B2 | 12/2010 | Nguyen et al. | |
| 7,860,962 B2 | 12/2010 | White et al. | |
| 7,925,616 B2 | 4/2011 | Hurwood et al. | |
| 8,225,229 B2 | 7/2012 | Thorn et al. | |
| 8,312,385 B2 | 11/2012 | Bier | |
| 8,527,588 B2 | 9/2013 | Beck et al. | |
| 8,903,768 B2 | 12/2014 | Bhogal et al. | |
| 2002/0083092 A1 | 6/2002 | Simpson | |
| 2002/0140719 A1 | 10/2002 | Amir et al. | |
| 2003/0222876 A1 | 12/2003 | Giemborek et al. | |
| 2003/0222890 A1 | 12/2003 | Salesin et al. | |
| 2004/0044691 A1 | 3/2004 | Wajda | |
| 2004/0253991 A1 | 12/2004 | Azuma | |
| 2005/0004885 A1* | 1/2005 | Pandian et al. | 707/1 |
| 2005/0132045 A1 | 6/2005 | Hornback, Jr. et al. | |
| 2005/0138540 A1 | 6/2005 | Baltus et al. | |
| 2005/0197906 A1 | 9/2005 | Kindig et al. | |
| 2006/0002315 A1 | 1/2006 | Theurer et al. | |
| 2006/0014546 A1* | 1/2006 | Bodin et al. | 455/456.1 |
| 2006/0041686 A1 | 2/2006 | Caspi et al. | |
| 2006/0056304 A1 | 3/2006 | Moore | |
| 2006/0066503 A1 | 3/2006 | Sampsell et al. | |
| 2006/0136828 A1 | 6/2006 | Asano | |
| 2006/0184508 A1 | 8/2006 | Fuselier et al. | |
| 2006/0288023 A1 | 12/2006 | Szabo | |
| 2007/0132727 A1 | 6/2007 | Garbow et al. | |
| 2007/0288584 A1 | 12/2007 | Tsai et al. | |
| 2008/0005233 A1 | 1/2008 | Cai et al. | |
| 2008/0018582 A1 | 1/2008 | Yang et al. | |
| 2008/0034320 A1 | 2/2008 | Ben-Shachar et al. | |
| 2008/0133769 A1 | 6/2008 | Salesky et al. | |
| 2008/0154907 A1 | 6/2008 | Prasad et al. | |
| 2008/0246775 A1 | 10/2008 | Fisher et al. | |
| 2008/0275871 A1* | 11/2008 | Berstis et al. | 707/5 |
| 2008/0288992 A1 | 11/2008 | Usman et al. | |
| 2009/0012821 A1 | 1/2009 | Besson et al. | |
| 2009/0013045 A1 | 1/2009 | Maes et al. | |
| 2009/0226152 A1 | 9/2009 | Hanes | |
| 2009/0300020 A1 | 12/2009 | Chen et al. | |
| 2009/0313329 A1* | 12/2009 | Agrawal et al. | 709/204 |
| 2010/0010921 A1 | 1/2010 | Liu et al. | |
| 2010/0131523 A1 | 5/2010 | Yu et al. | |
| 2010/0235285 A1* | 9/2010 | Hoffberg | 705/75 |
| 2011/0029482 A1 | 2/2011 | Gimsom et al. | |
| 2011/0029658 A1 | 2/2011 | Werth et al. | |
| 2011/0043652 A1* | 2/2011 | King et al. | 348/222.1 |
| 2011/0078532 A1 | 3/2011 | Vonog et al. | |
| 2011/0078615 A1 | 3/2011 | Bier | |
| 2011/0085211 A1* | 4/2011 | King et al. | 358/474 |
| 2011/0173256 A1 | 7/2011 | Khalatian | |
| 2011/0173266 A1 | 7/2011 | Ohashi et al. | |
| 2011/0195667 A1* | 8/2011 | Hassan et al. | 455/62 |
| 2011/0258574 A1 | 10/2011 | Adams | |
| 2011/0314387 A1 | 12/2011 | Gold et al. | |
| 2012/0004960 A1 | 1/2012 | Ma et al. | |
| 2012/0016770 A1* | 1/2012 | Thomas | 705/26.63 |
| 2012/0050320 A1 | 3/2012 | Verbeque et al. | |
| 2012/0084866 A1* | 4/2012 | Stolfo | 726/25 |
| 2012/0182384 A1 | 7/2012 | Anderson et al. | |
| 2013/0151624 A1 | 6/2013 | Bhogal et al. | |
| 2013/0151973 A1 | 6/2013 | Bhogal et al. | |
| 2013/0151976 A1 | 6/2013 | Bhogal et al. | |
| 2013/0159021 A1* | 6/2013 | Felsher | 705/3 |
| 2013/0159822 A1 | 6/2013 | Grossman et al. | |
| 2013/0159874 A1 | 6/2013 | Bhogal et al. | |
| 2013/0159880 A1 | 6/2013 | Bhogal et al. | |
| 2013/0326576 A1 | 12/2013 | Zhang et al. | |
| 2014/0075341 A1 | 3/2014 | Bhogal et al. | |
| 2014/0082518 A1 | 3/2014 | Bhogal et al. | |
| 2014/0100927 A1 | 4/2014 | Bhogal et al. | |
| 2014/0101253 A1 | 4/2014 | Bhogal et al. | |
| 2014/0129520 A1 | 5/2014 | Bhogal et al. | |

FOREIGN PATENT DOCUMENTS

| | | |
|---|---|---|
| JP | 11327523 A | 11/1999 |
| JP | 2005348262 A | 12/2005 |
| JP | 2006268638 A | 10/2006 |
| JP | 2006338531 A | 12/2006 |
| JP | 2008234072 A | 10/2008 |
| JP | 2009205278 A | 9/2009 |
| JP | 2011100270 A | 5/2011 |
| WO | 0198888 A | 12/2001 |
| WO | 0198888 A2 | 12/2001 |
| WO | 0209086 A1 | 1/2002 |
| WO | 02054192 A | 7/2002 |
| WO | 2006127430 A1 | 11/2006 |
| WO | 2011161735 A1 | 12/2011 |

OTHER PUBLICATIONS

Final Office Action, dated Feb. 12, 2015, regarding U.S. Appl. No. 13/323,696, 25 pages.

"Create Custom Shows within a Presentation in PowerPoint," Microsoft Corporation, http://www.offce.microsoft.com/en-us/powerpoint-help/creat-custom-shows-within-a-presentation, accessed Mar. 12, 2012, 1 page.

Office action regarding U.S. Appl. No. 13/668,294, dated Feb. 28, 2014, 15 pages.

Office action regarding U.S. Appl. No. 13/668,294, dated Dec. 27, 2013, 15 pages.

Notice of allowance dated Apr. 22, 2014, regarding U.S. Appl. No. 13/323,681, 10 pages.

Porst, "X.5 iChat," Quarter Life Crisis—The World According to Sven-S. Porst, http://earthlingsoft.net/ssp/blog/2007/12/x5_chat, accessed Mar. 12, 2012, 20 pages.

Yun, "Manage and Monitor Meeting Bandwidth," Acrobat® Connect Pro User Community, http://www.connectusers.com/tutorials/2009/03/connection_status/index.php?format, accessed Mar. 12, 2012, 5 pages.

Office Action, dated Aug. 15, 2014, regarding U.S. Appl. No. 14/082,123, 30 pages.

Office Action, dated Sep. 11, 2014, regarding U.S. Appl. No. 13/323,696, 28 pages.

Office Action, dated Aug. 15, 2014, regarding U.S. Appl. No. 13/325,950, 35 pages.

Notice of Allowance, dated Jul. 29, 2014, regarding U.S. Appl. No. 13/668,294, 19 pages.

"Architecture for a Dynamic Information Area Control," IBM Technical Disclosure Bulletin, IBM Corp. New York, NY, 37 (10):245-246, Oct. 1, 1994.

Au et al., "Netscape Communicator's Collapsible Toolbars," In: CHI '98, Human Factors in Computing Systems, Conference Proceedings, ACM Press, New York, NY, pp. 81-86, Apr. 18, 1998.

Reimer et al., "Presence-Based, Context-Sensitive Real-Time Collaboration (RTC)—Research Directions for a New Type of eCollaboration System," 19th Bled eConference, eValues, Bled, Slovenia, Jun. 5-7, 2006, 16 pages.

(56) References Cited

OTHER PUBLICATIONS

Sato et al., "XFIG Version 3.2 Patchlevel 2 Users Manual," http://www.math.unm.edu/xfig/index.html, Jul. 2, 1998, 4 pages.

Office Action, dated Feb. 27, 2015, regarding U.S. Appl. No. 13/326,007, 40 pages.

Final Office Action, dated Feb. 27, 2015, regarding U.S. Appl. No. 14/082,123, 20 pages.

Office Action, dated Mar. 6, 2015, regarding U.S. Appl. No. 14/082,128, 40 pages.

Final Office Action, dated Feb. 26, 2015, regarding U.S. Appl. No. 13/325,950, 19 pages.

Notice of Allowance, dated Apr. 24, 2015, regarding U.S. Appl. No. 13/326,007, 14 pages.

Notice of Allowance, dated Apr. 28, 2015, regarding U.S. Appl. No. 14/082,128, 14 pages.

Office Action, dated May 21, 2015, regarding U.S. Appl. No. 13/323,696, 28 pages.

Notice of Allowance, dated May 12, 2015, regarding U.S. Appl. No. 13/325,950, 14 pages.

Notice of Allowance, dated May 8, 2015, regarding U.S. Appl. No. 14/082,123, 14 pages.

* cited by examiner

CONTEXT-SENSITIVE COLLABORATION CHANNELS

This application is a continuation of application Ser. No. 13/323,681, filed Dec. 12, 2011.

BACKGROUND

1. Field

The disclosure relates generally to a network data processing system and, in particular, to collaboration channels in the network data processing system. Still more particularly, the present disclosure relates to an apparatus, and computer program product for collaborating over context-sensitive collaboration channels in the network data processing system.

2. Description of the Related Art

Currently when a computer user wishes to discuss information presented on a window by a product, the user has to leave the product window and go to a separate window to search for collaboration on the information. The user may desire to see what collaboration channels exist for various topics of interest related to the information and possibly even for the product presenting the information.

Providers of information and products sometimes include context sensitive help. However, context sensitive help may be insufficient for the user who desires to discuss the information with people. Providers of information and of products sometimes include a collaboration channel for users. However, a collaboration channel may not be the collaboration channel the computer user wants to use. The computer user may desire a collaboration channel that is more specific or less specific than the provided collaboration channel. Further, the computer user may desire to use a collaboration channel of a different type than the one provided. Still further, the computer user may desire to talk to someone who is not the provider. For example, the user may desire to create a new context-sensitive collaboration channel without having to leave the product.

Therefore, it would be advantageous to have an apparatus, and computer program product that takes into account at least some of the issues discussed above, as well as possibly other issues.

SUMMARY

In one illustrative embodiment, an apparatus and computer program product for collaborating is provided. Responsive to a computer system receiving a selection from a user for a portion of a document, the computer system identifies a context for the selected portion of the document. The computer system identifies a set of collaboration channels corresponding to the context. The computer system determines whether the set of collaboration channels corresponding to the context is empty. The computer system then creates a new collaboration channel based on the context for the selected portion of the document responsive to the set of collaboration channels corresponding to the context being empty.

DETAILED DESCRIPTION

Figure 1:
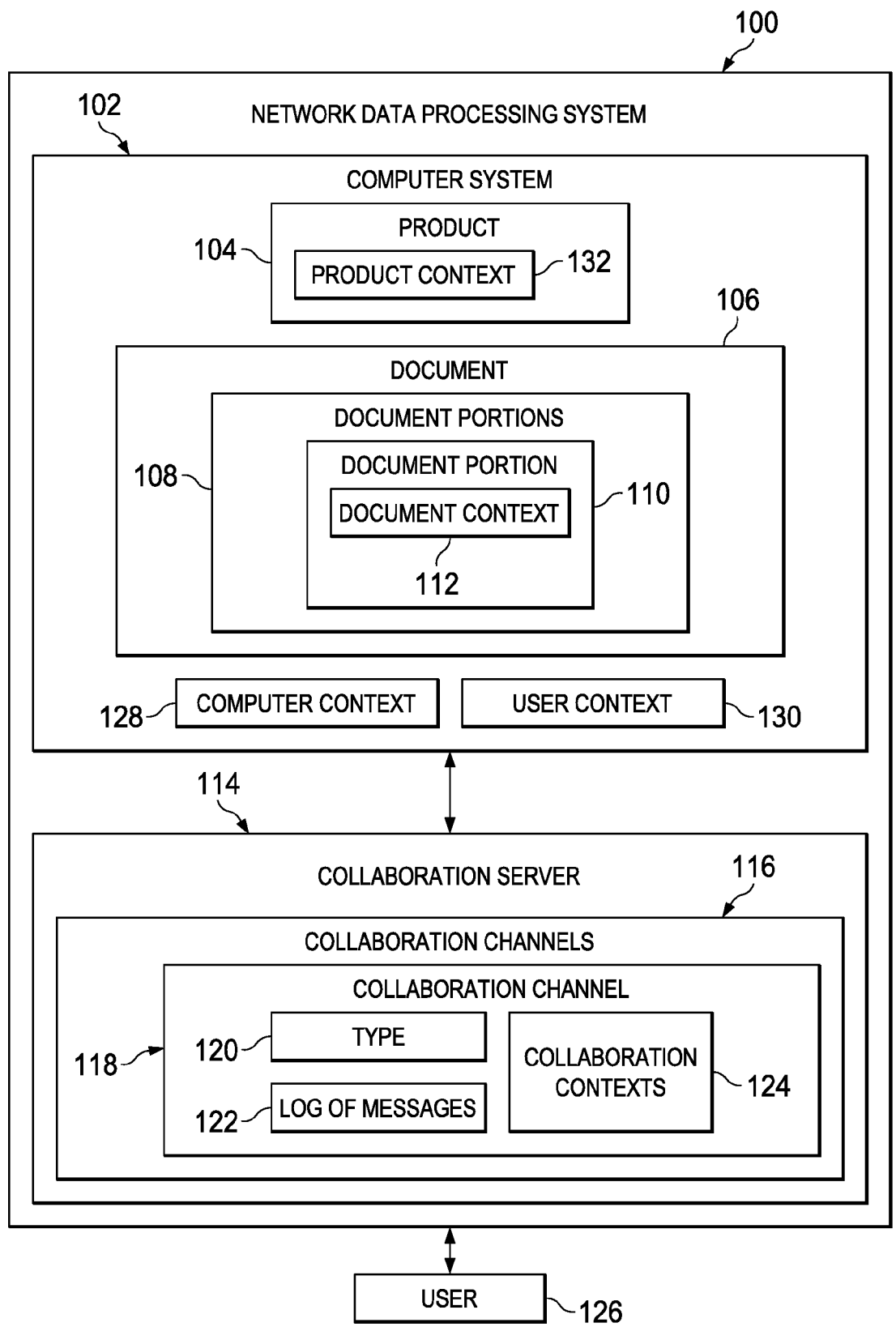
FIG. 1 is a block diagram of components involved in collaborating over context-sensitive collaboration channels in a network data processing system in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may be run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The different illustrative embodiments recognize and take into account a number of different considerations. For example, the different illustrative embodiments recognize and take into account that collaboration servers may provide a process to establish a collaboration, such as by using a collaboration channel established for the collaboration. The different illustrative embodiments also recognize and take into account that collaboration servers and web crawlers may provide a process to search for collaboration channels of interest. The different illustrative embodiments further recognize and take into account that there are known solutions for identifying context of information. For example, latent semantic analysis may be used to determine whether a particular given collaboration channel is well suited for a given topic. Further, term frequency and inverse document frequency may also be used to determine whether a particular given collaboration channel is well suited for a given topic.

Thus, one or more illustrative embodiments provide an apparatus and computer program product for collaborating. In one example, responsive to a computer system receiving a selection from a user for a portion of a document, the computer system identifies a context for the selected portion of the document. The computer system identifies a set of collaboration channels corresponding to the context. The computer system determines whether the set of collaboration channels corresponding to the context is empty. The computer system then creates a new collaboration channel based on the context for the selected portion of the document responsive to the set of collaboration channels corresponding to the context being empty.

With reference now to the figures and, in particular, with reference to FIG. 1, an illustration of components involved in collaborating over context-sensitive collaboration channels in a network data processing system is depicted in accordance with an illustrative embodiment. In this illustrative example, computer system 102 is present in network data processing system 100. Computer system 102 may comprise a set of computers. A "set," as used herein with reference to items, means one or more items. For example, "set of computers" is one or more computers. When more than one computer is present in computer system 102, those computers may be in communication with each other. This communication may be facilitated through a medium such as a network. This network may be, for example, without limitation, a local area network, a wide area network, an intranet, the internet, and some other suitable type of network.

In these illustrative examples, product 104 is located on computer system 102. Product 104 may comprise hardware, software, or a combination of the two. Software of product 104 may be, for example, without limitation, a program, an application, a plug-in, or some other form of program code.

As depicted, computer system 102 may include document 106. In these illustrative examples, document 106 includes a set of document portions such as document portions 108. As depicted, each document portion 110 includes document context 112. In these illustrative examples, document portions 108 of document 106 may be arranged hierarchically. More particularly, document context 112 of each document portion may be used hierarchically based on the arrangement of document portions 108 in document 106. In these illustrative examples, document context 112 of each document portion 110 may be determined by product 104. For example, document context 112 of each document portion 110 may include information extracted by product 104 from text, images, video, audio, metadata, and other suitable information that can be extracted from document portion 110. In these illustrative examples a document may comprise information of any kind. For example, without limitation, a document may be a web page being browsed by a web browser, a product manual being presented by document viewer, a product error message presented by an application, and any other suitable information presented to a user.

In this illustrative example, collaboration server 114 is present in network data processing system 100. Collaboration server 114 may comprise a set of computers. Collaboration server 114 may be in communication with the other computers in network data processing system 100. This communication may be facilitated through a medium such as a network. This network may be, for example, without limitation, a local area network, a wide area network, an intranet, the internet, and some other suitable type of network. Collaboration server 114 may be used to establish collaborations using collaboration channels 118. For example, product 104 on computer system 102 may communicate with collaboration server 114 for establishing a collaboration using collaboration channel 118. In this example, having established the collaboration using collaboration channel 118, a user of product 104 may collaborate with other users over collaboration channel 118.

In these illustrative examples, each collaboration channel is of a particular type depicted by type 120 in collaboration channel 118. For example, type 120 of each collaboration channel 118 in collaboration channels 116 on collaboration server 114 may include chat channels, blogs, discussion forums, social network pages, videoconference sessions, teleconference sessions, shared application sessions, electronic meeting sessions, email threads, and any other suitable type of collaboration for communicating information about documents and products.

As depicted, each collaboration channel 118 also includes log of messages 122. In these illustrative examples, log of messages 122 comprises the particular messages that are sent and received over collaborations that use each respective collaboration channel 118. In these illustrative examples, log of messages 122 are used to determine collaboration contexts 124 of each respective collaboration channel 118. In these illustrative examples, collaboration contexts 124 of each respective collaboration channel 118 may be determined by product 104 using log of messages 122. In these illustrative examples product 104 may present document portion 110 as selectable based on document context 112 of document portion 110 matching collaboration contexts 124 of collaboration channel 118. For example, in response to product 104 identifying a match between document context 112 of document portion 110 and collaboration contexts 124 of collaboration channel 118, product 104 may modify presentation of document portion 110 and make it selectable. In this example, responsive to the user selecting document portion 110 product 104 may establish a collaboration using collaboration channel 118.

In these illustrative examples, user 126 may use product 104 to select one or more document portions 108 for determining document contexts such as document context 112 that are of interest to user 126. In these illustrative examples, user 126 may also use product 104 to select one or more collaboration channels 116 that have collaboration contexts 124 closely matching context 112. A "match or matching" as used herein with reference to a plurality of items, means that the items are either exactly like each other or may be similar to each other within a reasonable threshold and thus closely match each other. Further, product 104 may use lexical analysis, semantic analysis, stemming, synonyms, conflation, term frequency, and many other processes known in the art for determining if information matches within a reasonable threshold.

In these illustrative examples, user 126 may also use product 104 to further establish one or more collaborations using the selected one or more collaboration channels 116. More particularly, user 126 may use product 104 to create one or more collaboration channels 116 having document contexts such as document context 112 that are of interest to user 126. In these illustrative examples, user 126 may also use product 104 to select, enter, send, and receive messages, and to browse the messages of collaborations established using the selected one or more collaboration channels 118.

In these illustrative examples, product 104 may also identify and filter collaboration channels using computer context 128, user context 130, product context 132, and any other context that is suitable for identifying and filtering collaboration channels. In these illustrative examples, computer context 128 may be identified by product 104 or by another product associated with computer system 102. In these illustrative examples, computer context 128 may include operating system version information, computer identification information, application program version information, the domain in which the computer is running, a physical address where computer system 102 is located, and a logical identification of computer system 102, such as an owner name. For example, the logical identification of computer system 102 may include a corporate department name for which computer system 102 has been assigned and the user name assigned to service computer system 102. As another example, the computer identification information of computer system 102 may include the manufacturer of computer system 102, the model name of computer system 102, the serial number of computer system 102, and any other suitable information for identifying computer system 102. In these illustrative examples, user context 130 may include user 126 selected preferences and user 126 information. For example, user selected preferences in user context 130 may include a preference for a collaboration channels of a particular type, a preference for selecting one collaboration channel or multiple collaboration channels, and a preference for filtering collaboration channels based on computer context 128, user context 130, and product context 132. Further, user information in user context 130 may include a name of user 126 and other user identification information. In this example, other user identification may include, without limitation, authority information, user classification information, and a preferred spoken language of user 126. In these illustrative examples, product context 128 may be any information provided by product 104 that is suitable for identifying product 104 and any document portion 110 produced and presented by product 104. For example, product context 128 may include version information for product 104, a name for product 104, and any information classifying product 104 that is useful for identifying collaboration channels.

In these illustrative examples, product 104 may use computer context 128, user context 130, and product context 132 to identify which collaboration channels are associated with document portion 110. Further, product 104 may use computer context 128, user context 130, and product context 132 to filter out collaboration channels that are not associated with document portion 110. In these illustrative examples, the use of computer context 128, user context 130, and product context 132 to identify and filter out collaboration channels may be based on user selected preferences in user context 130. For example, user selected preferences in user context 130 may be to use a particular set of information from computer context 128, user context 130, and product context 132 to filter out collaboration channel 118 if it does not meet a threshold for including the particular set information in log of messages 122 of collaboration channel 118.

The illustration of network data processing system 100 in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these functional components may be combined, divided, or combined and divided into different blocks when implementing an illustrative embodiment.

For example network data processing system 100 may be a local area network (LAN), a wide area network (WAN), an intranet, the Internet, or some combination thereof. As another illustrative example, document 106 may be located on another computer other than computer system 102 such as web page being viewed by a web browser.

Figure 2:
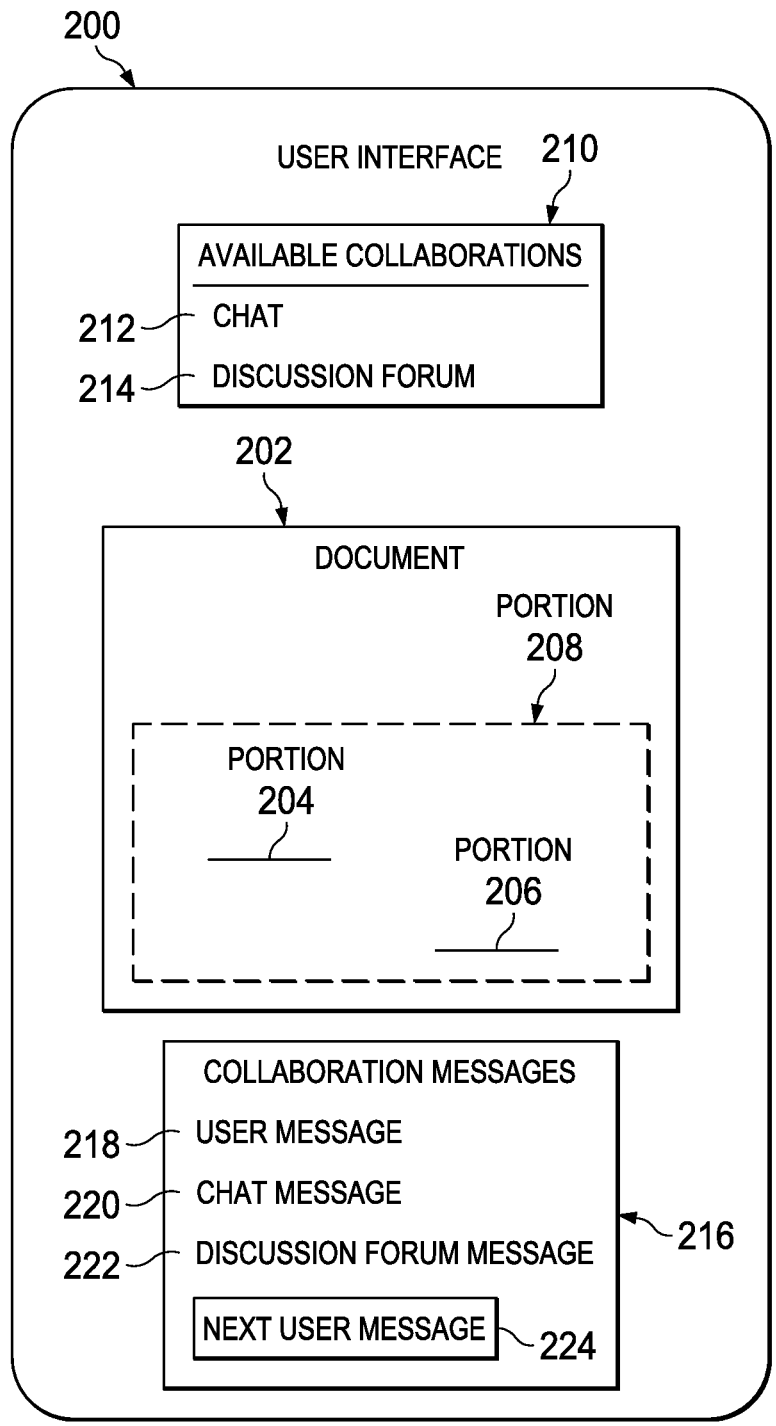
FIG. 2 is an example of a graphical user interface in accordance with an illustrative embodiment.

With reference now to FIG. 2, an illustration of a user interface is depicted in accordance with an illustrative embodiment. User interface 200 is an illustrative example of one implementation of a graphical user interface for product 104 in computer system 102 in FIG. 1. In other illustrative examples, user interface 200 may also be any type of user interface suitable for presenting the contents of user interface 200 to one or more users.

In this illustrative example, user interface 200 includes document 202. Document 202 is an example of document 106 in FIG. 1. As depicted portion 204 and portion 206 are located in portion 208 in document 202. As depicted, the portions of document 202 are arranged hierarchically such that any context of a surrounding portion also applies to the portions within. For example, context associated with document 202 applies to portion 208, portion 204, and portion 206. Further, context associated with portion 208 applies to portion 204 and portion 206. More particularly, context associated with portion 204 and portion 206 may be more specific than the context for portion 208. Still more particularly, a collaboration channel matching the context for portion 204 may not match the context for portion 206.

As depicted, user interface 200 also includes available collaborations 210. Available collaborations 210 are an example of collaboration channels 116 in FIG. 1. In these illustrative examples available collaborations 210 are a list of collaborations matching the contexts of the portions of document 202. In this illustrative example, chat 212 and discussion forum 214 in available collaborations 210 are each examples of collaboration channel 118 in FIG. 1.

As depicted, user interface 200 further includes collaboration messages 216. Collaboration messages 216 are examples of messages in log of messages 122 in FIG. 1. For example, collaboration messages 216 may include messages previously entered by a user such as user 126 in FIG. 1. In these illustrative examples, user message 218 is a first message entered by user 126 in collaboration messages 216. In these illustrative examples, user message 218 is sent to collaboration channels 116, such as chat 212 and discussion forum 214. As depicted, chat message 220 is a message received from a collaboration channel such as chat 212. For example, chat message 220 may be sent in response to user message 218. As depicted, discussion forum message 222 is a message received from a collaboration channel such as discussion forum 214. For example, discussion forum message 222 may be sent in response to user message 218. In these illustrative examples, next user message 224 is a message being entered by user 126 in collaboration messages 216. For example, next user message 224 may comprise a follow up question to be sent to one or more established collaborations such as chat 21 and discussion forum 214.

Figure 3:
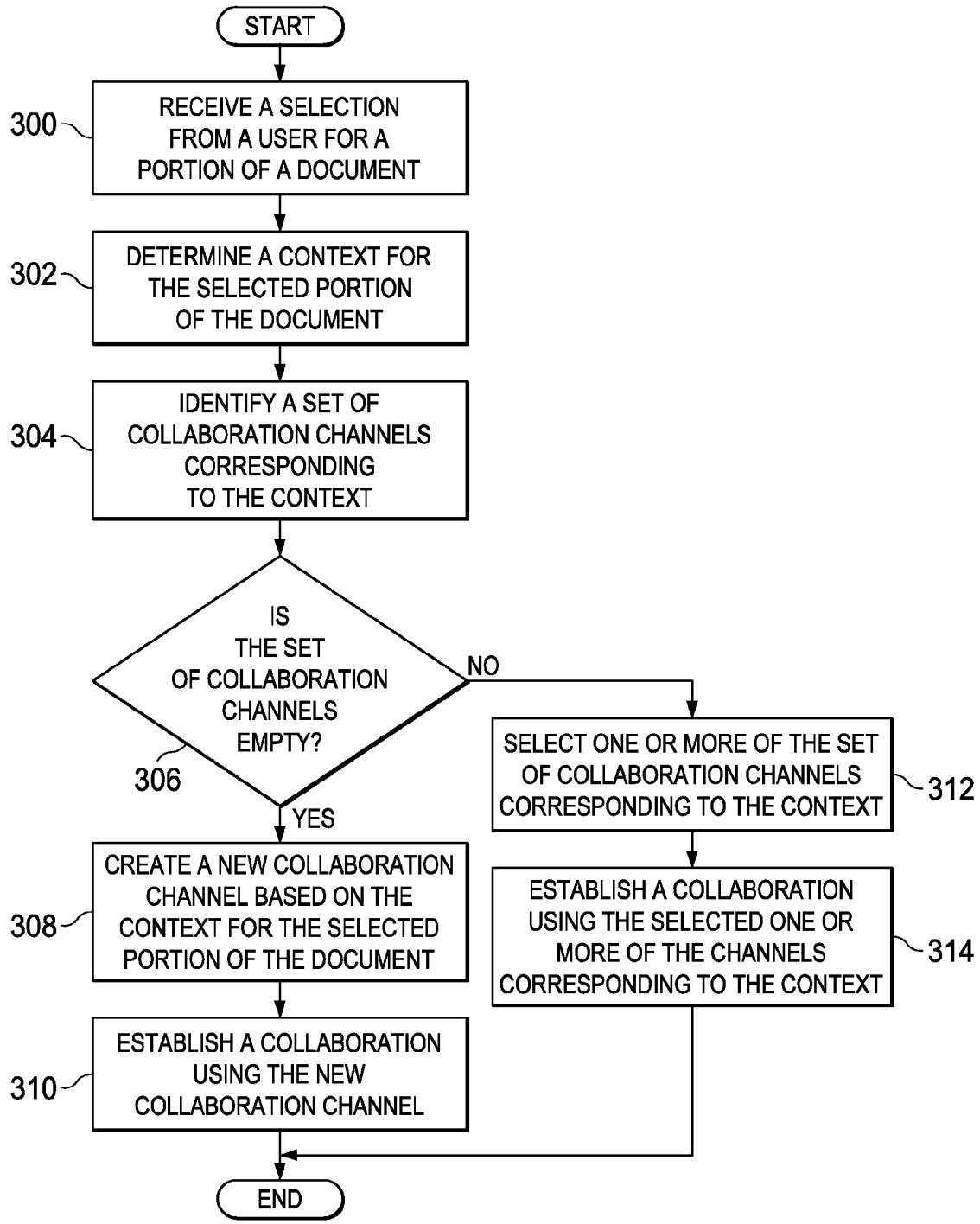
FIG. 3 is a flowchart of a process for collaborating over context-sensitive collaboration channels in a network data processing system in accordance with an illustrative embodiment.

Turning next to FIG. 3, an illustrative example of a flowchart of a process for collaborating over context-sensitive collaboration channels in a network data processing system is depicted in accordance with an illustrative embodiment. The steps in FIG. 3 may be implemented in network data processing system 100 in FIG. 1. In particular, the steps may be implemented in software, hardware, or a combination of the two by product 104 in computer system 102 in FIG. 1. The steps may also be implemented by collaboration server 114 in FIG. 1. As depicted, FIG. 3 performs a number of steps which establish one or more collaboration channels for collaborating about a portion of a document selected by a user.

The process begins by receiving a selection from a user for a portion of a document (step 400). For example, user 126 in FIG. 1 may use a user input device to make a request for a collaboration channel related to portion 206 in portion 208 in document 202 on display 200 in FIG. 2. As depicted, the process then determines a context for the selected portion (step 302). In this example, portion 206 selected by the user uses a pre-defined context such as document context 112 in FIG. 1. In other illustrative examples, product 104 in computer system 102 may also be used to process the selected portion to determine document context 112 for selected portion.

As depicted, the process then identifies a set of collaboration channels corresponding to the plurality of contexts (step 304). As depicted, responsive to the process identifying that the set of collaboration channels is empty, the process creates a new collaboration channel based on the context for the selected portion of the document (step 308). The process then establishes a collaboration using the new collaboration channel (step 310) with the process terminating thereafter. As also depicted, responsive to the process identifying that the set of collaboration channels is not empty, the process selects one or more of the set of collaboration channels corresponding to the context (step 312). The process then establishes a collaboration using the selected one or more of the set of collaboration channels corresponding to the context (step 314) with the process terminating thereafter.

Figure 4:
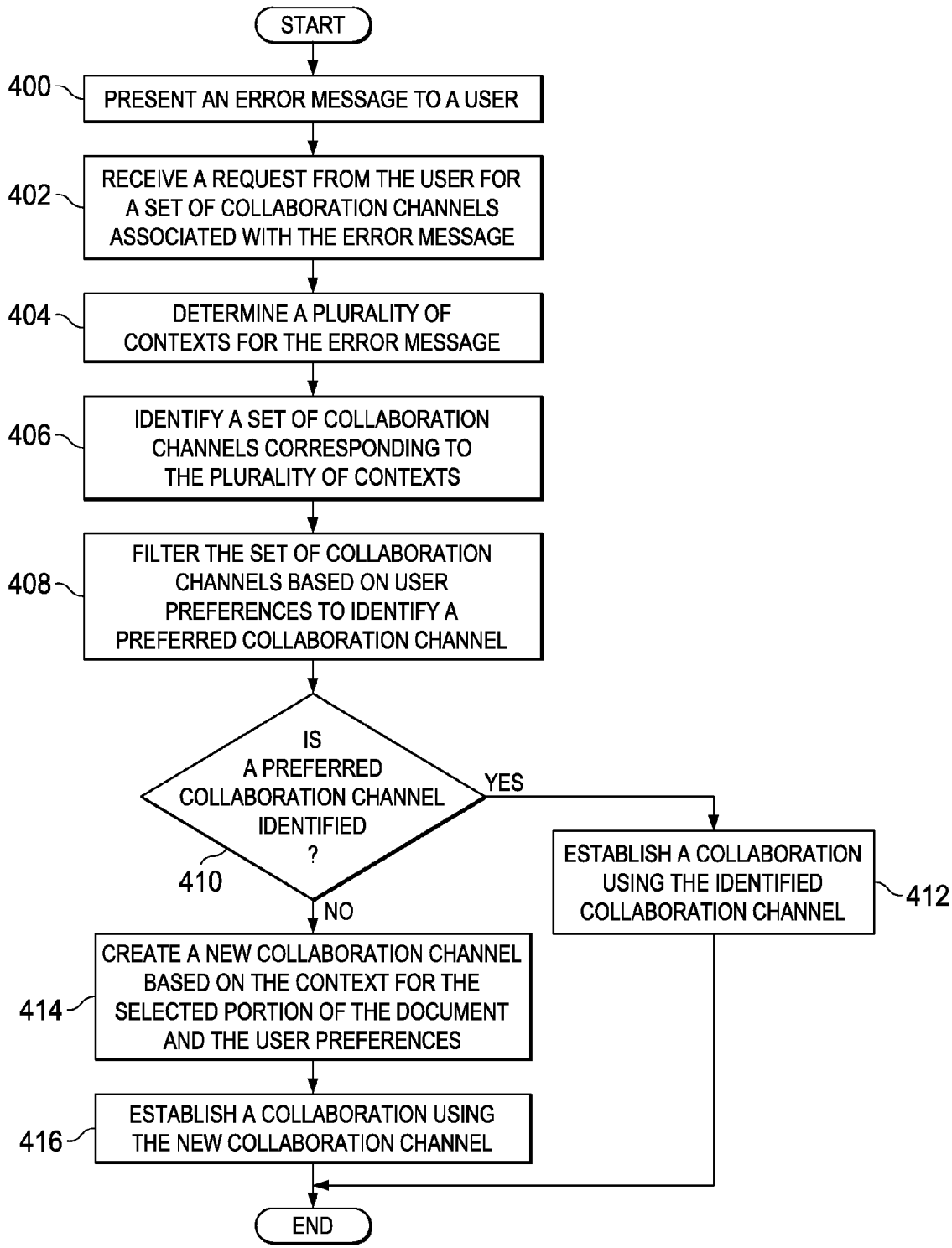
FIG. 4 is a flowchart of a process for establishing a preferred collaboration channel in accordance with an illustrative embodiment.

Turning next to FIG. 4, an illustrative example of a flowchart of a process for establishing a preferred collaboration channel is depicted in accordance with an illustrative embodiment. The steps in FIG. 4 may be implemented in network data processing system 100 in FIG. 1. In particular, the steps may be implemented in software, hardware, or a combination of the two by product 104 in computer system 102 in FIG. 1. The steps may also be implemented by collaboration server 114 in FIG. 1. As depicted, FIG. 4 performs a number of steps which establish a preferred collaboration channel for collaborating about a particular error message in response to a request by a user such as user 126 in FIG. 1.

The process begins by presenting an error message to a user (step 400). The process then receives a request from the user for a set of collaboration channels associated with the error message (step 402). For example, user 126 in FIG. 1 may use a user input device to make a request for a collaboration channel related to the error message. As depicted, the process then determines a plurality of contexts for the error message (step 404). For example, the error message may be a document such as document 106 in FIG. 1 having a plurality of document portions 108 in FIG. 1 each of which having a particular document context 112 in FIG. 1. In this illustrative example, product 104 in computer system 102 may be used to determine document context 112 for each document portion 110 in the plurality of document portions 108 of the error message. This illustrative example is not meant imply limitations to the manner in which context that may be identified and used to identify and filter collaboration channels. For example, other products may be used to derive the plurality of contexts. As another example, any context useful for identifying and filtering collaboration channels may be included in the plurality of contexts.

The process identifies a set of collaboration channels corresponding to the plurality of contexts (step 406). The process then filters the set of collaboration channels based on user preferences to identify a preferred collaboration channel (step 408). As depicted, responsive to the process identifying a preferred collaboration channel, the process establishes collaboration using the identified collaboration channel (step 412) with the process terminating thereafter. As also depicted, responsive to the process identifying that a preferred collaboration channel was not identified, the process creates a new collaboration channel based on the context for the selected portion of the document and the user preferences (step 414). The process then establishes collaboration using the new collaboration channel (step 416) with the process terminating thereafter. In this illustrative example, the steps may be performed by product 104 in FIG. 1.

Figure 5:
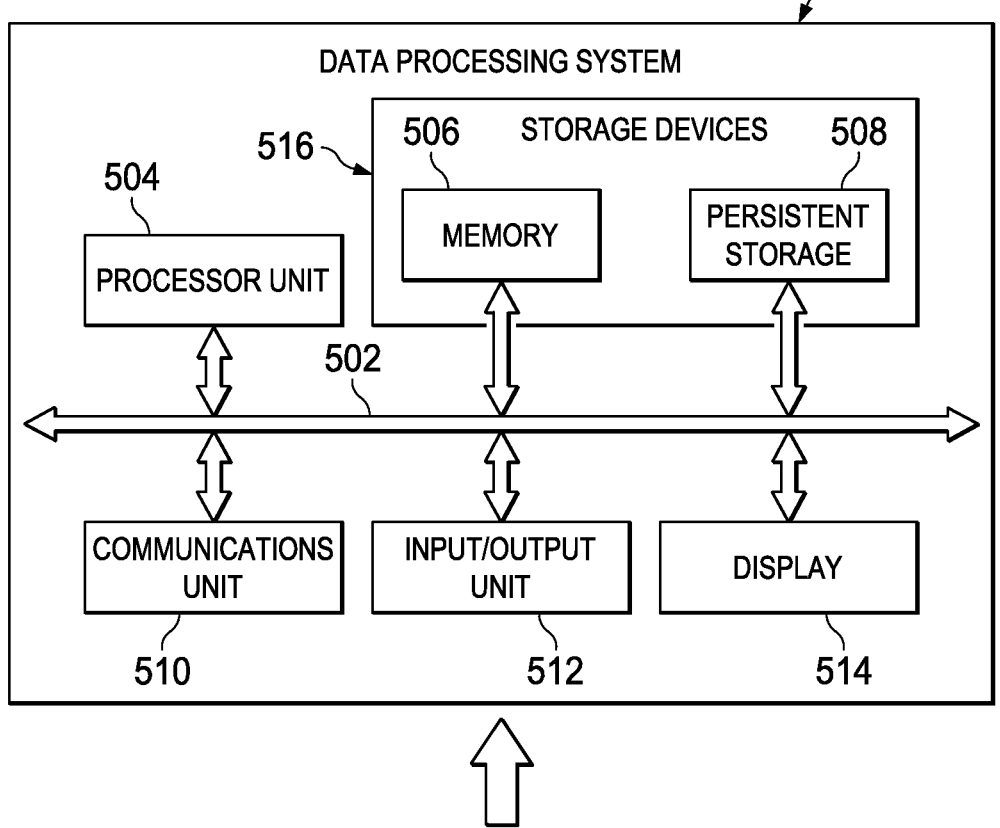
FIG. 5 is an illustration of a data processing system in accordance with an illustrative embodiment.
Figure 5:
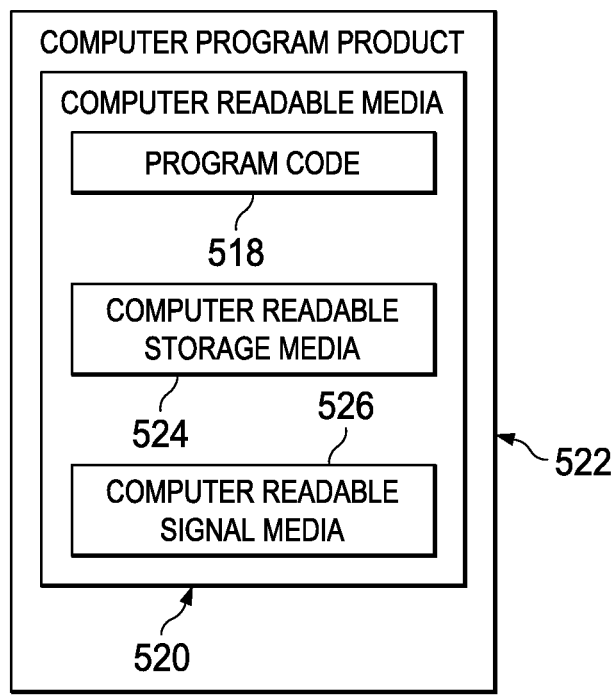

Turning now to FIG. 5, an illustration of a data processing system is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514. Data processing system 500 is an example of a data processing system that may be used to implement collaborating over context-sensitive collaboration channels in a network data processing system. Data processing system 500 is also an example of a data processing system that may be used to implement the hardware and software components of computer system 102 in FIG. 1. Data processing system 500 may also be used to implement collaboration server 114 in FIG. 1. More particularly, data processing system 500 may be used to implement product 104 in computer system 102 in FIG. 1.

Processor unit 504 serves to process instructions for software that may be loaded into memory 506. Processor unit 504 may be a number of processors, a multi-processor core, or some other type of processor, depending on the particular implementation. "A number," as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for processing by processor unit 504. The processes of the different embodiments may be performed by processor unit 504 using computer-implemented instructions, which may be located in a memory, such as memory 506.

These instructions are referred to as program code, computer usable program code, or computer readable program code that may be read and processed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for processing by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500.

In some instances, computer readable storage media 524 may not be removable from data processing system 500. In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, a remote data processing system, or some other device capable of storing and transmitting program code 518. For example, program code stored in the computer readable storage medium in data processing system 500 may be downloaded over a network from the remote data processing system to the computer readable storage medium in data processing system 500. Additionally, program code stored in the computer readable storage medium in the server computer may be downloaded over the network from the server computer to a computer readable storage medium in the remote data processing system.

The different components illustrated for data processing system 500 are not meant to provide architectural limitations to the manner in which different embodiments may be implemented. The different illustrative embodiments may be implemented in a data processing system including components in addition to and/or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, communications unit 510 may include a number of devices that transmit data, receive data, or transmit and receive data. Communications unit 510 may be, for example, a modem or a network adapter, two network adapters, or some combination thereof. Further, a memory may be, for example, memory 506, or a cache, such as found in an interface and memory controller hub that may be present in communications fabric 502.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/ or components but do not preclude the presence or addition of one or more other features, integers, steps, operations, elements, components, and/or groups thereof.

Thus, the illustrative embodiments provide an apparatus and computer program product for collaborating over context-sensitive collaboration channels in a network data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application, or technical improvement over technologies found in the marketplace, or to enable others of ordinary skill in the art to understand the embodiments disclosed herein.

The flowcharts and block diagrams in the figures illustrate the architecture, functionality, and operation of possible implementations of computer systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A computer comprising:
   a bus;
   a processor unit connected to the bus;
   a computer readable storage device connected to the bus; and
   program code for collaborating, wherein the program code is stored on the computer readable storage device and is configured to be run by the processor unit to:
   modify a presentation of a document that includes a plurality of portions by making each portion of the document selectable by a user;
   identify a context of a user-selected portion of the document in response to receiving a selection by the user of a portion of the document;
   identify a set of collaboration channels corresponding to the context of the user-selected portion of the document;
   determine whether the set of collaboration channels corresponding to the context of the user-selected portion of the document is empty;
   create a new collaboration channel based on the context of the user-selected portion of the document in response to determining that the set of collaboration channels corresponding to the context of the user-selected portion of the document is empty;
   select one or more of the set of collaboration channels corresponding to the context of the user-selected portion of the document in response to determining that the set of collaboration channels corresponding to the context of the user-selected portion of the document is not empty; and establish a collaboration that communicates information about the user-selected portion of the document between the user and other users by utilizing the one or more of the set of collaboration channels corresponding to the context of the user-selected portion of the document.

2. The computer of claim 1, wherein the program code configured to be run by the processor unit to identify the set of collaboration channels corresponding to the context of the user-selected portion of the document comprises searching through a log of sent and received collaboration messages associated with each collaboration channel of a list of collaboration channels including chats, blogs, discussion forums, social networks, videoconferences, teleconferences, shared applications, electronic meetings, and email threads for a match between the log of sent and received collaboration messages and the context of the user-selected portion of the document; and filtering each collaboration channel of the list of collaboration channels based on a computer context, a user context, and a product context automatically identified by the computer.

3. The computer of claim 2 wherein the program code is further configured to be run by the processor unit to:
determine that the plurality of portions of the document correspond to one or more collaboration channels of the list of collaboration channels; and
highlight the plurality of portions of the document for selection by the user.

4. The computer of claim 1, wherein the document is one of a web page, a presentation, and information presented on a window of an application program.

5. A computer program product for collaborating, the computer program product comprising:
a non-transitory computer readable storage medium;
first program code for modifying a presentation of a document that includes a plurality of portions by making each portion of the document selectable by a user;
second program code, responsive to receiving a selection by the user of a portion of the document, for identifying a context of the user-selected portion of the document;
third program code for identifying a set of collaboration channels corresponding to the context of the user-selected portion of the document;
fourth program code for determining whether the set of collaboration channels corresponding to the context of the user-selected portion of the document is empty;
fifth program code, responsive to the determining that the set of collaboration channels corresponding to the context of the user-selected portion of the document is empty, for creating a new collaboration channel based on the context of the user-selected portion of the document;
sixth program code, responsive to determining that the set of collaboration channels corresponding to the context of the user-selected portion of the document is not empty, for selecting one or more of the set of collaboration channels corresponding to the context of the user-selected portion of the document; and
seventh program code for establishing a collaboration that communicates information about the user-selected portion of the document between the user and other users by utilizing the one or more of the set of collaboration channels corresponding to the context of the user-selected portion of the document, wherein the first program code, the second program code, the third program code, the fourth program code, the fifth program code, the sixth program code, and the seventh program code are stored on the non-transitory computer readable storage medium.

6. The computer program product of claim 5, wherein the third program code for identifying the set of collaboration channels corresponding to the context of the user-selected portion of the document comprises:
searching through a log of sent and received collaboration messages associated with each collaboration channel of a list of collaboration channels including chats, blogs, discussion forums, social networks, videoconferences, teleconferences, shared applications, electronic meetings, and email threads for a match between the log of sent and received collaboration messages and the context of the user-selected portion of the document; and
filtering each collaboration channel of the list of collaboration channels based on a computer context, a user context, and a product context automatically identified by the computer.

7. The computer program product of claim 6 further comprising:
eighth program code for determining that the plurality of portions of the document correspond to one or more collaboration channels of the list of collaboration channels; and
ninth program code for highlighting the plurality of portions of the document for selection by the user, wherein the eighth program code and the ninth program code are stored on the non-transitory computer readable storage medium.

8. The computer program product of claim 5, wherein the non-transitory computer readable storage medium is a first non-transitory computer readable storage medium, and wherein the first non-transitory computer readable storage medium is in a server data processing system, and wherein the program code is downloaded over a network to a remote data processing system for use in a second non-transitory computer readable storage medium in the remote data processing system.

9. A method for collaborating, the method comprising:
modifying, by a computer system, a presentation of a document that includes a plurality of portions by making each portion of the document selectable by a user;
responsive to receiving, by the computer system, a selection by the user of a portion of the document, identifying, by the computer system, a context of the user-selected portion of the document;
identifying, by the computer system, a set of collaboration channels corresponding to the context of the user-selected portion of the document;
determining, by the computer system, whether the set of collaboration channels corresponding to the context of the user-selected portion of the document is empty;
responsive to the computer system determining that the set of collaboration channels corresponding to the context of the user-selected portion of the document is empty, creating, by the computer system, a new collaboration channel based on the context of the user-selected portion of the document;
responsive to the computer system determining that the set of collaboration channels corresponding to the context of the user-selected portion of the document is not empty, selecting, by the computer system, one or more of the set of collaboration channels corresponding to the context of the user-selected portion of the document; and establishing, by the computer system, a collaboration that communicates information about the user-selected portion of the document between the user and other users by utilizing the one or more of the set of collaboration channels corresponding to the context of the user-selected portion of the document.

10. The method of claim 9 further comprising:
determining, by the computer system, whether the set of collaboration channels corresponding to the context of the user-selected portion of the document includes a first collaboration channel and a second collaboration channel corresponding to the context;
establishing, by the computer system, a first collaboration using the first collaboration channel and a second collaboration using the second collaboration channel responsive to the set of collaboration channels corresponding to the context of the user-selected portion of the document including the first collaboration channel and the second collaboration channel;
responsive to receiving, by the computer system, a collaboration message from the user about the user-selected portion of the document, sending, by the computer system, the collaboration message about the user-selected portion of the document to the first collaboration and the second collaboration; and
presenting, by the computer system, collaboration messages from the other users to the user received, by the computer system, from the first collaboration and the second collaboration.

11. The method of claim 9 further comprising:
responsive to the computer system creating the new collaboration channel based on the context of the user-selected portion of the document, establishing, by the computer system, a new collaboration using the new collaboration channel;
responsive to the computer system receiving a collaboration message from the user about the user-selected portion of the document, the computer system sending the collaboration message to the new collaboration; and
presenting, by the computer system, collaboration messages from the other users to the user that the computer system receives from the new collaboration.

12. The method of claim 9, wherein the identifying, by the computer system, of the set of collaboration channels corresponding to the context of the user-selected portion of the document comprises:
selecting, by the computer system, the set of collaboration channels from a list of collaboration channels including chats, blogs, discussion forums, social networks, videoconferences, teleconferences, shared applications, electronic meetings, and email threads.

13. The method of claim 12, wherein the selecting, by the computer system, of the set of collaboration channels from the list of collaboration channels comprises:
searching, by the computer system, through a log of sent and received collaboration messages associated with each collaboration channel of the list of collaboration channels for a match between the log of sent and received collaboration messages and the context of the user-selected portion of the document; and
filtering, by the computer system, each collaboration channel of the list of collaboration channels based on a computer context, a user context, and a product context automatically identified by the computer system.

14. The method of claim 9, wherein the receiving, by the computer system, of the selection by the user of the portion of the document comprises:
receiving, by the computer system, a highlighting of the portion of the document by the user.

15. The method of claim 12 further comprising:
determining, by the computer system, that the plurality of portions of the document correspond to one or more collaboration channels of the list of collaboration channels; and
highlighting, by the computer system, the plurality of portions of the document for selection by the user.

16. The method of claim 9, wherein the plurality of portions of the document is arranged in a hierarchy, the context of the user-selected portion of the document is a first context, and the new collaboration channel is a first new collaboration channel, and further comprising:
identifying, by the computer system, a second context associated with a parent portion of the user-selected portion of the document;
identifying, by the computer system, a second set of collaboration channels corresponding to the second context associated with the parent portion of the user-selected portion of the document;
determining, by the computer system, whether the second set of collaboration channels corresponding to the second context associated with the parent portion of the user-selected portion of the document is empty; and
responsive to the computer system determining that the second set of collaboration channels corresponding to the second context associated with the parent portion of the user-selected portion of the document is empty, creating, by the computer system, a second new collaboration channel based on the second context associated with the parent portion of the user-selected portion of the document.

17. The method of claim 9, wherein the document is one of a web page, a presentation, and information presented on a window of an application program.

* * * * *